US011815176B2

(12) United States Patent
Varvayanis et al.

(10) Patent No.: US 11,815,176 B2
(45) Date of Patent: Nov. 14, 2023

(54) DROP-IN LUBE-ON-DEMAND VALVE AND KIT

(71) Applicant: Sonnax Transmission Company, Bellows Falls, VT (US)

(72) Inventors: John Varvayanis, Bellows Falls, VT (US); Maura J. Stafford, Warner Robins, GA (US); James A. Dial, Springfield, MO (US)

(73) Assignee: Sonnax Transmission Company, Bellows Falls, VT (US)

( * ) Notice: Subject to any disclaimer, the term of this patent is extended or adjusted under 35 U.S.C. 154(b) by 92 days.

(21) Appl. No.: 17/507,407

(22) Filed: Oct. 21, 2021

(65) Prior Publication Data

US 2022/0136598 A1    May 5, 2022

Related U.S. Application Data

(60) Provisional application No. 63/107,297, filed on Oct. 29, 2020.

(51) Int. Cl.
*F16H 61/02*    (2006.01)
*F16K 31/122*    (2006.01)
*F16H 41/30*    (2006.01)
*F15B 13/04*    (2006.01)

(52) U.S. Cl.
CPC ..... *F16H 61/0267* (2013.01); *F15B 13/0401* (2013.01); *F16H 41/30* (2013.01); *F16K 31/1221* (2013.01)

(58) Field of Classification Search
CPC ............. F16H 61/0276; F16H 61/0267; F16H 61/068; F16H 61/067; F16H 2061/0062; F16H 2061/0065; F16B 13/04; F16K 31/1221
See application file for complete search history.

(56) References Cited

U.S. PATENT DOCUMENTS 6,634,377 B1 * 10/2003 Stafford .............. F16H 61/0276
137/454.2
6,736,747 B1 * 5/2004 Stafford .............. F16H 61/0276
475/116

* cited by examiner

*Primary Examiner* — Daphne M Barry
(74) *Attorney, Agent, or Firm* — ANDRUS INTELLECTUAL PROPERTY LAW, LLP (57) ABSTRACT

A drop-in lube boost valve assembly replaces an OE lube boost valve assembly in a vehicle transmission hydraulic circuit. The OE valve assembly has a valve body with inlet, balancing and outlet ports. The drop-in valve assembly includes a sleeve having inlet and outlet ports, and a bore extending between and fluidically connecting the ports. The drop-in valve ports are spaced from each other. The sleeve includes valve and spring chambers. A valve has a valve face, a sealing portion and a spring stem and is positioned in the sleeve with the sealing portion positioned in the sleeve bore. A spring is positioned on the spring stem. The valve reciprocates in the sleeve between an open state in which the sealing portion does not overlie the sleeve outlet port and a closed state in which the sealing portion overlies and closes off the outlet port.

18 Claims, 5 Drawing Sheets

DROP-IN LUBE-ON-DEMAND VALVE AND KIT

CROSS-REFERENCE TO RELATED APPLICATION DATA

This application claims the benefit of and priority to Provisional U.S. Patent Application Ser. No. 63/107,297, filed Oct. 29, 2020, titled DROP-IN LUBE-ON-DEMAND VALVE AND KIT, the disclosure of which is incorporated herein in its entirety.

BACKGROUND

The present disclosure relates to a flow control valve for a vehicle transmission for cooling and lubrication, and more particularly to limiting flow control valve for a transmission hydraulic system.

Figure 1:
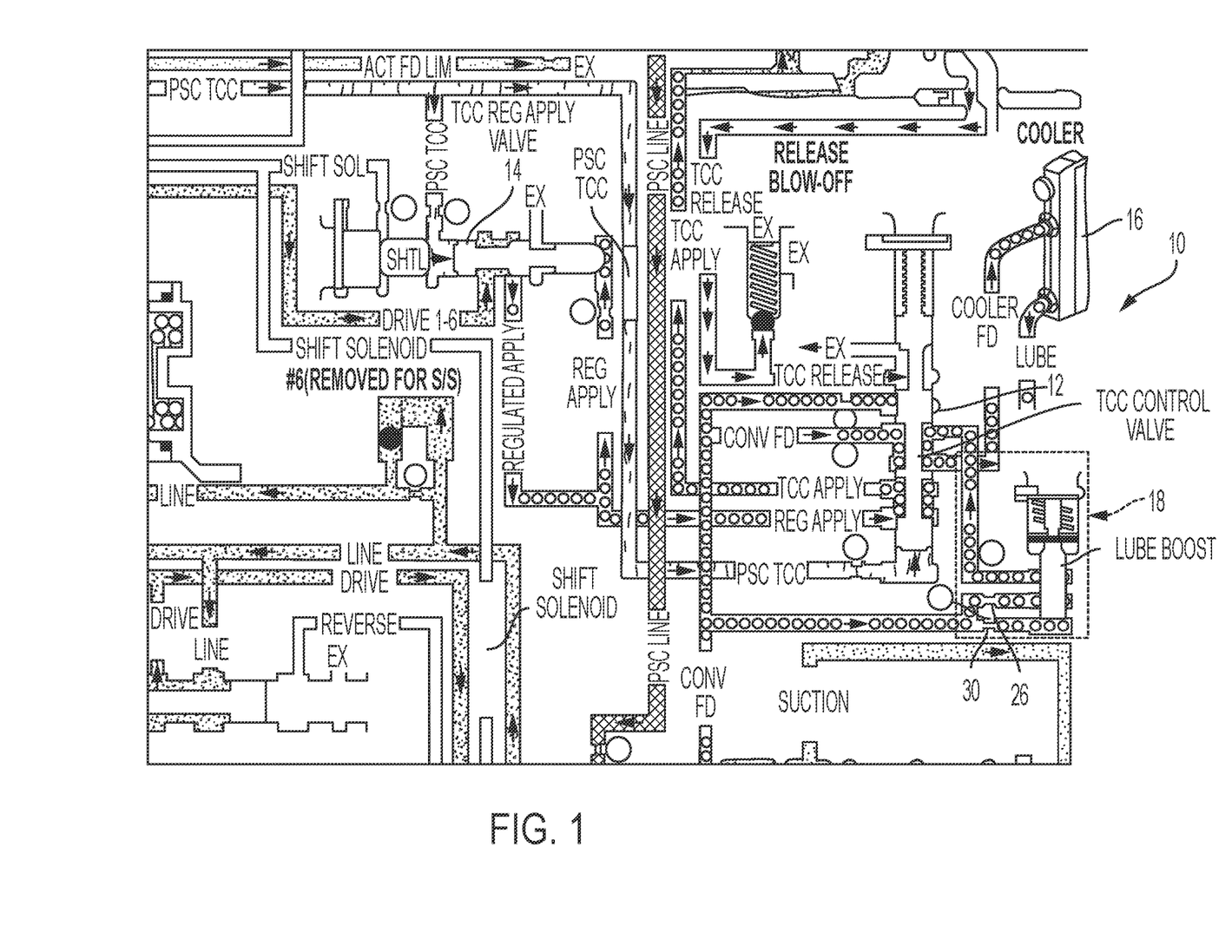
FIG. 1 is an illustration of a portion of an example hydraulic for a vehicle transmission.

Cooling of the hydraulic fluid is necessary to maintain the transmission operating properly. The fluid is circulated through a hydraulic circuit in the transmission that includes a series of lines, valves, such as control and apply valves and through a cooler. As seen in FIG. 1, the fluid is fed from the torque converter feed circuit to a lube boost valve, from the lube boost valve to a torque converter clutch control valve and from the control valve to the lube and cooler circuits.

The current, original equipment (OE) valve in Generation 3, GM 6T4X family transmissions is a reciprocating valve that functions as a regulating flow control valve in high pressure converter feed conditions. The valve is used in TCC apply conditions and serves to allow additional converter feed pressure to feed the cooler circuit. Fluid is fed to the valve from the same converter feed circuit that feeds the cooler circuit through the TCC control valve. In higher pressure converter feed conditions, it increases the flow to the cooler.

Because the current OE valve functions as a regulating flow control valve in high pressure converter feed conditions, it is a very active valve and is subject to wear. Extreme wear allows the fluid in the converter feed circuit (which is a regulated line pressure) to bypass the cooler feed bore and exit through the valve exhaust. This can result in reduced line pressure, causing converter apply issues, low lube/cooler flow issues, and may cause overheating.

While some solutions are known, the known solutions require increasing the size of the valve bore (for example, by reaming), and installing a new oversized valve. This is a time consuming and costly fix and may not solve the problem of valve wear as the valve will remain a very active valve and will continue to wear.

Accordingly, there is a need for a lube boost valve that reduces wear on the valve. Desirably, such a valve is limiting flow control valve and is less active than known boost valves. More desirably, such a valve is a drop-in part that does not require modification to the valve body (e.g., does not require reaming of the valve body). More desirably still, such a valve can be part of a kit for retrofit or modifying portions of an OE transmission hydraulic circuit.

SUMMARY

In one aspect of the present disclosure, a drop-in lube boost valve assembly replaces an original equipment (OE) lube boost valve in a vehicle transmission hydraulic circuit. The OE lube boost valve assembly has a valve body having an inlet port, a balancing port and an outlet port.

The drop-in valve assembly reduces wear on the valve compared to the OE valve. The drop-in valve is limiting flow control valve and is less active than OE boost valves.

In an embodiment the drop-in valve assembly includes a sleeve, a valve and a spring and fits into (drops into) the OE valve body, The sleeve has an inlet port, an outlet port, and a bore extending between and fluidically connecting the inlet and outlet ports. The ports are longitudinally spaced from each other. The sleeve includes a valve chamber and a spring chamber. An end of the spring chamber forms a valve exhaust.

The valve has a sealing portion and a spring stem. The valve is positioned in the sleeve with the sealing portion positioned in the sleeve bore. The valve has a valve face. The spring is positioned on the valve spring stem.

The valve reciprocates in the sleeve between an open state and a closed state. In the open state, the sealing portion does not overlie the sleeve outlet port. Reciprocation to the open state is effected by application of a force exerted on the valve face by hydraulic fluid pressure. The valve reciprocates to closed state in which the sealing portion overlies and closes off the outlet port.

In embodiments, the sleeve outlet port is aligned with the body outlet port. In some embodiments, the sleeve inlet port is aligned with the body inlet port. In other embodiments the sleeve inlet port is positioned between body inlet port and the body balancing port.

In embodiments in which the sleeve inlet port is positioned between body inlet port and the body balancing port, the sleeve can include a reduced diameter region at about an end thereof, such that fluid flowing into the body inlet port flows along the reduced diameter region to the sleeve inlet port. In some embodiments, a plug can be positioned in the body balancing port.

The sleeve can be a one-piece element or a multi-piece element, such as a two-piece element. The valve assembly can further include a retaining member, such as a retaining clip for retaining the sleeve, the valve and the spring in the valve body.

In embodiments, the valve further includes a flange between the sealing portion and the spring stem.

In another aspect, a drop-in lube boost valve assembly replaces an original equipment (OE) lube boost valve, the drop-in valve assembly includes a valve having a sealing portion and a spring stem, with the valve positioned in the sleeve with the sealing portion positioned in the sleeve bore. The valve has a single valve face. The valve assembly further includes a spring positioned on the valve spring stem.

The valve reciprocates in the sleeve between an open state in which the sealing portion does not overlie the sleeve outlet port and a closed state in which the sealing portion overlies and closes off the outlet port. The valve reciprocates to the open state by application of a force exerted on the single valve face by hydraulic fluid pressure. The valve assembly can include a retaining member, such as a retaining clip, for retaining the valve and the spring in the valve assembly body.

In another aspect, a kit for replacing an OE lube boost valve includes a drop-in lube boost valve assembly having a sleeve with an inlet port, an outlet port, and a bore extending between and fluidically connecting the inlet and outlet ports, a valve having a sealing portion and a spring stem, with the valve positioned in the sleeve, and a spring positioned on the valve at a spring stem. The kit can further include one or both of a spring and a retaining clip.

A method for replacing an OE lube boost valve in a vehicle transmission hydraulic circuit includes removing the OE lube boost valve from the OE lube boost valve body, installing a sleeve in the OE lube boost valve body, the sleeve having an inlet port, an outlet port, and a bore extending between and fluidically connecting the inlet port and the outlet port, the inlet port and outlet port longitudinally spaced from each other, the sleeve including a valve chamber and a spring chamber, wherein an end of the spring chamber forms a valve exhaust, installing a valve in the sleeve, the valve having a sealing portion and a spring stem, the valve positioned in the sleeve with the sealing portion positioned in the sleeve bore, the valve having a valve face; and installing a spring on the valve spring stem.

The method can further include installing a retaining clip on the valve assembly body to retain the sleeve, the valve and the spring in the valve assembly body.

Further understanding of the present disclosure can be obtained by reference to the following detailed description in conjunction with the associated drawings, which are described briefly below.

DESCRIPTION OF THE DRAWINGS

An embodiment of a vehicle transmission is disclosed as an example and is not limited by the figures of the accompanying drawings, in which like references may indicate similar elements and in which:

FIGS. 2A and 2B are sectional illustrations of a known lube boost valve in which FIG. 2A shows the valve in the open state and FIG. 2B shows the valve in the closed state;

FIGS. 3A and 3B are sectional illustrations of an embodiment of a lube boost valve assembly in accordance with the present disclosure in which FIG. 3A shows the valve assembly in the open state and FIG. 3B shows the valve assembly in the closed state;

FIGS. 6A and 6B are sectional illustrations of yet another embodiment of the lube boost valve assembly in accordance with the present disclosure in which FIG. 6A shows the valve assembly in the open state and FIG. 6B shows the valve assembly in the closed state.

DETAILED DESCRIPTION

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

Referring now to FIG. 1, there is shown a partial hydraulic circuit 10 for a vehicle transmission. The circuit 10 includes, among other things, a torque converter clutch (TCC) control valve 12, a TCC regulator apply valve 14, a cooler 16, a lube boost valve 18 and a series of passages, ports and orifices in around and between the TCC control valve 12, TCC regulator apply valve 14, the cooler 16 and the lube boost valve 18.

The lube boost valve assembly 18 serves to control the flow of hydraulic fluid from the converter feed line 20 through the TCC control valve 12, to the lube cooler 16. The lube boost valve assembly 18 increases the flow of fluid when the pressure in the hydraulic system exceeds a certain predetermined pressure. Essentially, the valve assembly 18 increases the flow of fluid to the cooler 16 at high converter feed pressures.

Figure 2A:
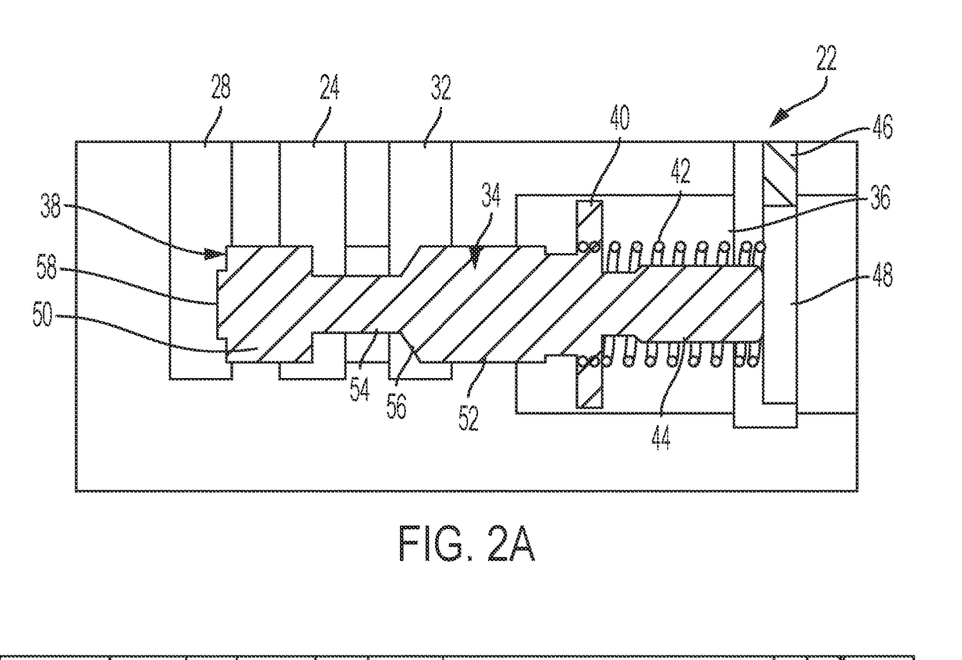
Figure 2B:
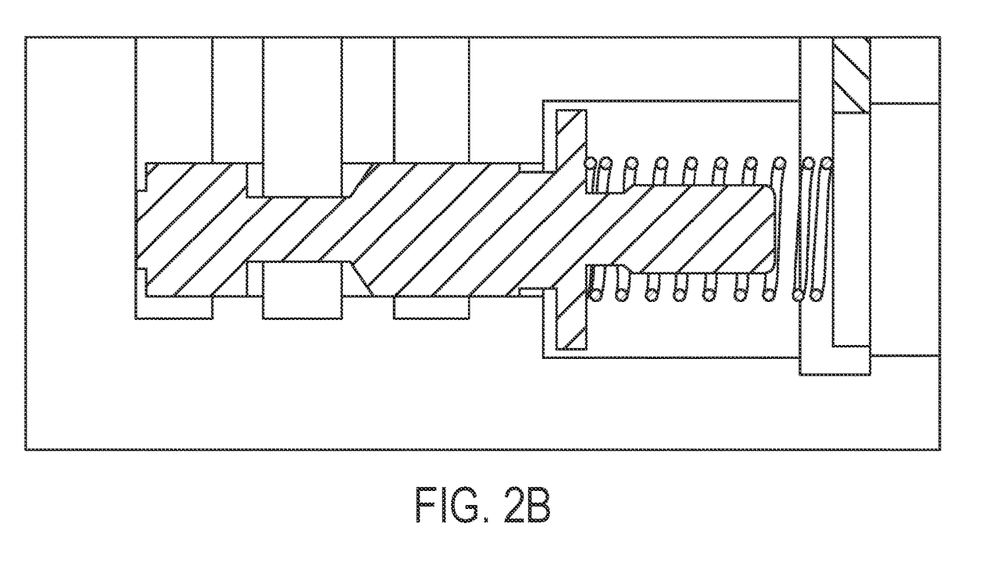

FIGS. 2A and 2B illustrate a known or original equipment (OE) lube boost valve assembly 18. The valve assembly 18 includes a body 22 having an inlet port 24 and inlet orifice 26, a balancing port 28 and balancing orifice 30 and an outlet port 32 (the orifices are illustrated in FIG. 1). A valve 34 is positioned in the body 22 for reciprocating between an open state (FIG. 2A) and a closed state (FIG. 2B). The body 22 includes a spring chamber 36 and a bore that extends through the spring chamber 36 and is open to, or in fluid communication with the outlet, inlet and balancing ports 32, 24, 28, respectively.

The valve 34 includes a flange 40. A spring 42 is positioned on a spring stem 44 on the valve 34 in the spring chamber 36. The valve 34 and spring 42 are retained in the valve assembly body 22 by a retaining clip 46. The spring 42 urges the valve assembly 18 to the closed state. The spring chamber 36 has a valve exhaust 48 at about the rear end of the retaining clip 46.

The valve 34 includes a first enlarged valve portion 50 that reciprocates between the balancing port 28 and a portion of inlet port 24 and a second enlarged valve portion 52 that reciprocates across the outlet port 32. A reduced diameter section or undercut 54 is formed between the first and second enlarged portions 50, 52. An upstream side of the second enlarged portion 52 has an angled face 56 that acts as a flow regulator.

In operation, hydraulic fluid flows into both the inlet and balancing ports 24, 28 from a common passage (the converter feed passage 20) through the inlet and balancing orifices 26, 30. Fluid flowing into the balancing port 28 applies a pressure to a back face 58 of the valve 34. Fluid flowing into the inlet port 24 flows into the port 24, through the undercut 54 and to the outlet port 32, thus flowing out of the valve assembly 18. Pressure applied by the fluid on face 58 urges the valve assembly 18 to the open state. Pressure applied to the back face 58 balances the flow through the valve assembly 18 and further urges the valve assembly 18 open under high pressure conditions. As will be understood, as fluid pressure increases, a greater force is exerted on the valve 34 (on the back face 58) to urge the valve assembly 18 open, which results in an increase in fluid flow through the valve assembly 18.

The fluid entering the balancing port 28 applies a pressure on the back face 58 of the valve 34, thus increasing the travel of the valve 34, also resulting in an increase in flow of fluid through the valve assembly 18. The valve 34 tends to actively move or bounce back and forth as the hydraulic pressure varies, that is there is instability in the valve. Active movement of the valve 34 causes wear in the valve assembly 18 and valve bore, which can result in hydraulic fluid bypassing the outlet port 32 and exiting through the valve exhaust 48. This can result in reduced line pressure, causing converter apply issues, low lube/cooler 16 flow issues, and may cause overheating.

Figure 3A:
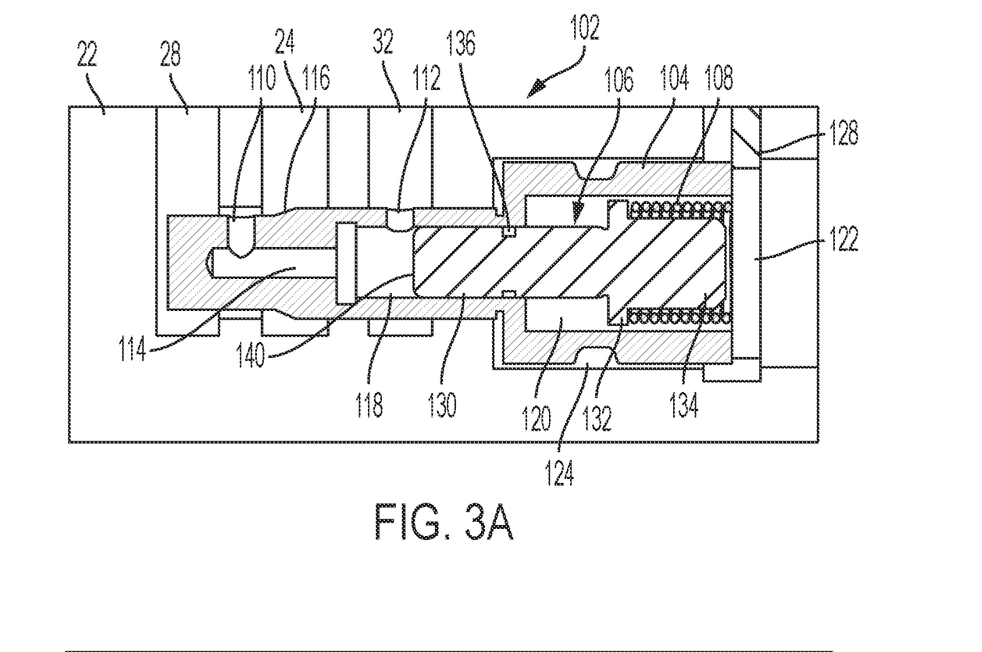
Figure 3B:
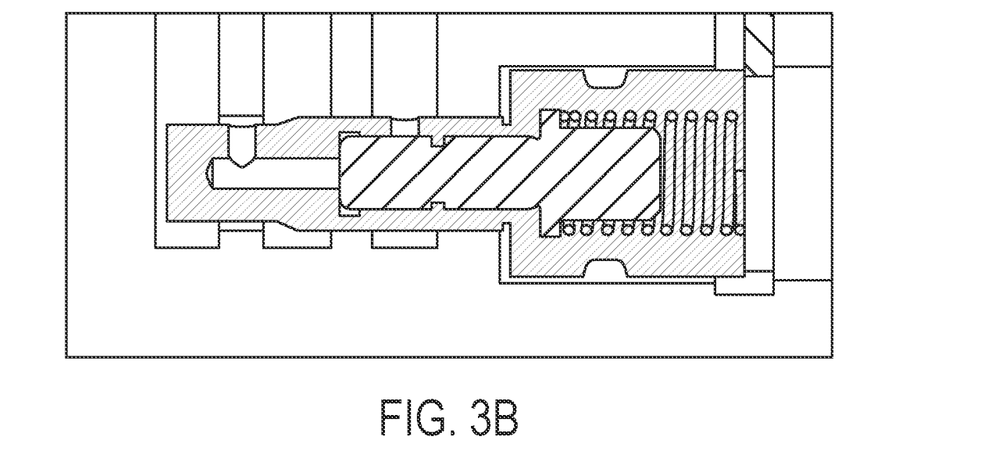

An embodiment of a drop-in lube-on-demand valve assembly 102 in accordance with present disclosure is illustrated in FIGS. 3A and 3B, in which FIG. 3A shows the valve assembly 102 in the open state and FIG. 3B shows the valve assembly 102 in the closed state. The illustrated valve assembly 102 is a drop-in valve that is installed in the OE valve body 22, in place of the OE valve. The valve assembly 102 includes a sleeve 104 that inserts into the OE valve body 22, a valve 106 and a spring 108.

The sleeve 104, which is stationary in the valve body 22, includes an inlet port 110, and an outlet port 112. A bore 114 extends between and fluidically connects the inlet and outlet ports 110, 112. In an embodiment, the inlet and outlet ports 110, 112 are formed radially in the sleeve 104 and are longitudinally spaced from each other. The sleeve inlet port 110 can be longitudinally offset relative to the body inlet port 24, positioned between the body inlet port 24 and the body balancing port 28. The sleeve outlet port 112 aligns with the body outlet port 32.

In an embodiment, the sleeve 104 includes a reduced outer diameter region or undercut, as indicated at 116, at about an end thereof, such that fluid flowing into the body inlet port 24 and flows along the reduced diameter region 116 to the sleeve inlet port 110.

The sleeve 104 includes a valve chamber 118 and a larger spring chamber 120. An end of the spring chamber 120 forms a valve exhaust 122. The sleeve 104 includes a radial recess 124. When positioned in the valve body 22, a seal (not shown), such as an O-ring, is positioned in the recess 124 to form a seal between the sleeve 104 and the valve body 22. A retaining member, such as the illustrated retaining clip 128 retains the sleeve 104, valve 106 and spring 108 in the valve body 22.

The valve 106 includes a sealing portion 130, a flange 132 and a spring stem 134. The valve 106 reciprocates in the sleeve 104 between an open state (FIG. 3A) in which the sealing portion 130 does not overlie the outlet port 112 and a closed state (FIG. 3B) in which sealing portion 130 overlies, sealing or closing off the outlet port 112.

The spring 108 is positioned on the spring stem 134 abutting the flange 132, in the sleeve spring chamber 120 and, as noted above, is retained in the valve body 22 with the sleeve 104 and valve 106 by the retaining clip 128. The spring 108 urges the valve 106 to the closed state.

In operation, referring to FIG. 3A, hydraulic fluid flows through the inlet orifice 26 and into the body inlet port 24. Fluid flows along the reduced outer diameter region 116 in the sleeve 104 and into the sleeve inlet port 110. Fluid enters the valve chamber 118 and exerts a force against a face 140 of the valve 106 and, when the fluid exceeds a predetermined pressure, it urges the valve 106 to the open state (against the spring 108 force). This increases the flow of fluid to the TCC control valve 12 and on to the cooler 16.

As the pressure of the fluid decreases, the pressure on the valve face 140 is reduced, allowing the spring 108 to overcome the fluid pressure and move the valve 106 to close the outlet port 112 as seen in FIG. 3B.

In embodiments, since the fluid pressure is the same at the balancing and inlet ports 28, 24, the balancing port 28 can be closed off by, for example, installing a plug in the balancing port 28. Because the pressure is equal at the balancing and inlet ports, 28, 24, alternatively, the balancing port 28 can be left open or unplugged without impact the operation of the valve 102.

Figure 4:
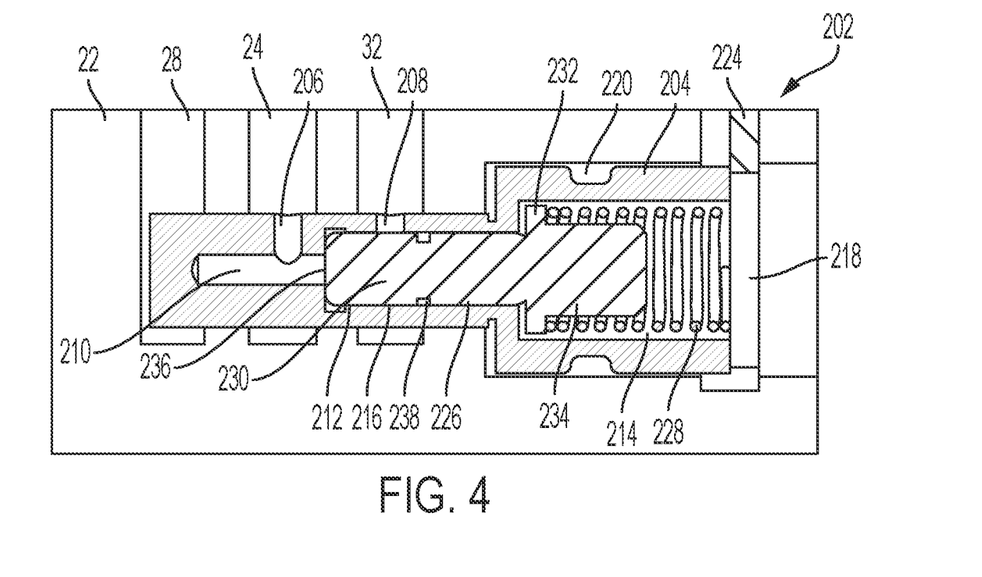
FIG. 4 is a sectional illustration of another embodiment of the lube boost valve assembly in accordance with the present disclosure, the valve assembly shown in the closed state.

Another embodiment of the drop-in lube-on-demand lube boost valve assembly 202 is illustrated in FIG. 4, the valve assembly 202 being shown in the closed state. In this embodiment of the valve assembly 202 the sleeve 204 includes an inlet port 206, and an outlet port 208. A bore 210 extends between and fluidically connects the inlet and outlet ports 206, 208. The inlet and outlet ports 206, 208 are formed radially in the sleeve 204 and are longitudinally spaced from each other. The sleeve inlet and outlet ports 206, 208 align with the body inlet and outlet ports 24, 32, respectively.

The sleeve 204 includes a valve chamber 212 and a larger spring chamber 214. An outer diameter of the valve chamber 212 has a substantially constant cross-section as indicated at 216. An end of the spring chamber 214 forms a valve exhaust 218. The sleeve 204 includes a radial recess 220 in which a seal (not shown), such as an O-ring, is positioned to form a seal between the sleeve 204 and the valve body 22. A retaining clip 224 retains the sleeve 204, valve 226 and spring 228 in the valve body 22.

The valve 226 includes a sealing portion 230, a flange 232 and spring stem 234. The sealing portion 230 includes a valve face 236 on which pressure is exerted from the hydraulic fluid. The valve 226 reciprocates in the sleeve 204 between an open state in which the sealing portion 230 does not overlie the outlet port 208 and a closed state (FIG. 4) in which sealing portion 230 overlies and seals or closes off the outlet port 208.

The spring 228 is positioned on the spring stem 234, abutting the flange 232, in the sleeve spring chamber 214 and, as noted above, is retained in the valve body 22 with the sleeve 204 and valve 226 by the retaining clip 224. The spring 228 urges the valve 226 to the closed state.

In operation, referring to FIG. 4, hydraulic fluid flows through the inlet orifice 26 and into the body inlet port 24. Fluid flows from the body inlet port 24 into the sleeve inlet port 206. Fluid enters the valve chamber 212 and exerts a force against the valve face 236 and, when the fluid exceeds a predetermined pressure, it urges the valve 226 to the open state (against the spring 228 force). This increases the flow of fluid to the TCC control valve 12 and on to the cooler 16.

As the pressure of the fluid decreases, the pressure on the valve face 236 is reduced, allowing the spring 228 to overcome the fluid pressure and move the valve 226 to close the outlet port 208 as seen in FIG. 4. Because the sleeve 204 fully overlies or closes off the balancing port 28, the balancing port 28 may or may not be closed off (as by a plug) without impact the operation of the valve 202.

Figure 5:
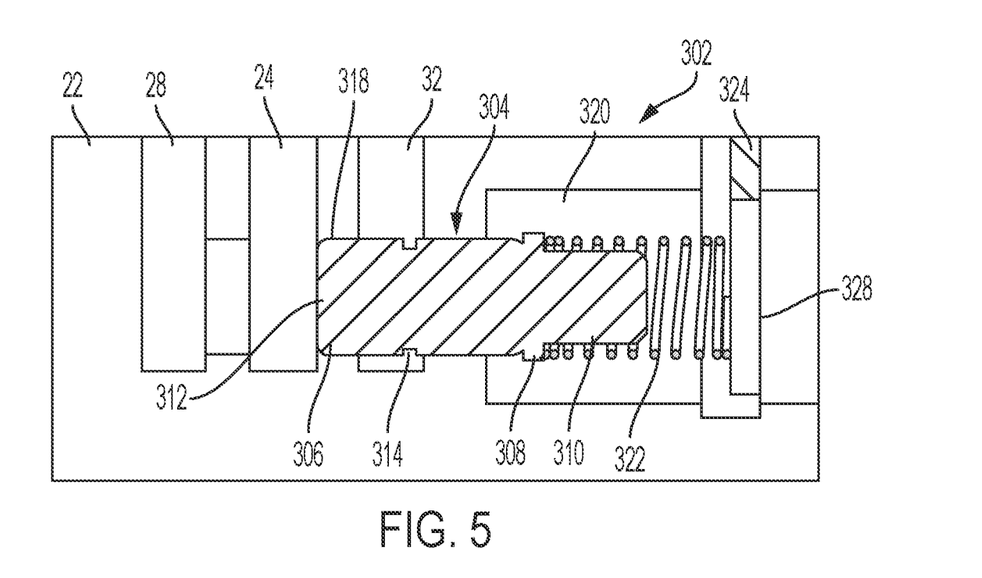
FIG. 5 is a sectional illustration of still another embodiment of the lube boost valve assembly in accordance with the present disclosure, the valve assembly shown in the closed state.

FIG. 5 illustrates another embodiment of the drop-in lube-on-demand lube boost valve assembly 302, the valve assembly 302 being shown in the closed state. In this embodiment of the valve assembly 302, the valve 304 replaces the OE valve. No sleeve is needed. The valve 304 includes a sealing portion 306, a flange 308 and spring stem 310. The valve 304 includes a valve face 312 on which pressure from the hydraulic fluid is exerted. The valve 304 reciprocates between an open state in which the sealing portion 306 does not overlie the outlet port 32 and a closed state in which sealing portion overlies, sealing or closing off the outlet port 32.

The spring 322 is positioned on the spring stem 310 abutting the flange 308 and is retained in the valve assembly 302 body with the valve 304 by the retaining clip 324. The spring 322 urges the valve 304 to the closed state.

In operation, referring to FIG. 5, hydraulic fluid flows through the inlet orifice 26 and into the body inlet port 24. Fluid flows from the body inlet port 24 into the valve assembly 302 body and exerts a force against the valve face 312. When the fluid exceeds a predetermined pressure it urges the valve 304 to the open state (against the spring 322 force). This increases the flow of fluid to the TCC control valve 12 and on to the cooler 16.

As the pressure of the fluid decreases, the pressure on the valve face 312 is reduced, allowing the spring 322 to overcome the fluid pressure and move the valve 304 to close the outlet port 32 as seen in FIG. 5. Because there is only one face 312 on the valve 304 on which fluid pressure is exerted, the balancing port 28 may or may not be closed off, (as by a plug) without impact the operation of the valve 302.

Figures 6A, 6B:
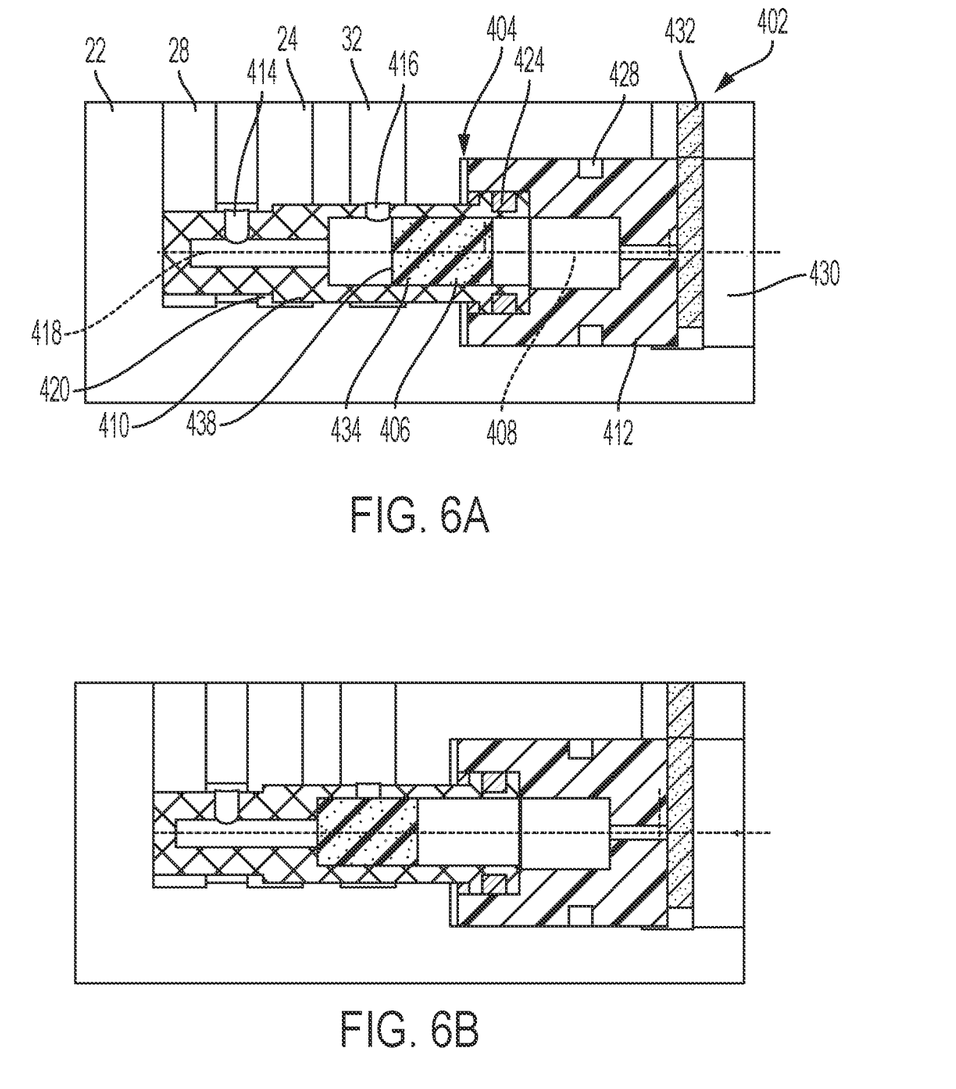

Still another embodiment of the drop-in lube-on-demand lube boost valve assembly 402 is illustrated in FIGS. 6A and 6B. This embodiment of the valve assembly 402 is similar to that of the valve assembly 102 shown in FIGS. 3A and 3B and includes a sleeve 404 that inserts into the OE valve body 22, a valve 406 and a spring (not shown, location indicated at 408). The sleeve 404 is a two-part sleeve.

The sleeve 404, which is stationary in the valve body 22, includes valve portion 410 and a spring portion 412. Inlet and outlet ports 414, 416, respectively, are formed in the valve portion 410. A bore 418 extends between and fluidically connects the inlet and outlet ports 414, 416. In an embodiment, the inlet and outlet ports 414, 416 are formed radially in the sleeve 404 and are longitudinally spaced from each other. The sleeve inlet port 414 can be longitudinally offset relative to the body inlet port 24, positioned between body inlet port 24 and the body balancing port 28. Alternatively, the body and sleeve inlet ports 24, 414 can be aligned with each other. The sleeve outlet port 416 aligns with the body outlet port 32. In an embodiment in which the body and sleeve inlet ports 24, 414 align, the body balancing port 28 may or may not be closed off (as by a plug) without impact the operation of the valve 402.

In an embodiment, in which the body and sleeve inlet ports 24, 414 are offset, the sleeve 404 includes a reduced diameter region 420 at about an end thereof, such that fluid flowing into the body inlet port 24 flows along the reduced diameter region 420 to the sleeve inlet port 414.

In embodiments, the valve portion 410 is mounted within the spring portion 412 and a seal (not shown), such as an O-ring is disposed in a radial recess 424 in an outer surface of the valve portion 410 to form a seal between the portions 410, 412. A seal (not shown) is also disposed between the spring portion 412 and the valve body 22, in a recess 428 in an outer surface of the spring portion 412 to form a seal between the spring portion 412 and the body 22. An end of the spring portion 412 (through the spring portion 412) forms a valve exhaust 430. A retaining clip 432 retains the sleeve portions 410, 412, valve 406 and spring 408 in the valve body 22. The valve 406 includes a valve face 438.

The valve 406 reciprocates in the sleeve 404 between an open state (FIG. 6A) in which the sealing portion 434 does not overlie the outlet port 416 and a closed state (FIG. 6B) in which sealing portion 434 overlies and seals or closes off the outlet port 416. The spring 408 is positioned on the spring stem (not shown) and urges the valve 406 to the closed state.

It will be appreciated from a study of the figures and the above descriptions of the various embodiments, in the present drop-in lube-on-demand lube boost valve assembly 102, 202, 302, 402, there is a single valve face 140, 236, 312, 438 on which pressure is exerted to move the valve against the spring force to open the valve assembly, and conversely, a single valve face on which pressure is reduced to allow the valve to move, by the spring force, to close the valve assembly. In such a configuration the lube boost valve assembly serves as a limiting flow control valve and is less active than known boost valves. It will also be appreciated that the lube boost valve assembly is a drop-in part that does not require modification to the valve body, that is, it does not require reaming of the valve body.

The described lube boost valve can be provided as a kit or part of a kit for retrofit or modifying portions of an OE transmission hydraulic circuit. The kit can include a valve, a sleeve having one or more portions and can include a spring. The kit can also include a retaining clip or ring.

A method to reduce the wear of an OE lube boost valve includes removing a retaining clip that retains an OE lube boost valve and removing the valve spring. A new valve having a valve face is installed in the valve body, a spring is installed in the body against the valve and a retaining clip installed to retain the spring and valve in the valve body. In methods, a sleeve is installed in the body (the sleeve may be a one-piece or a two piece sleeve) and installing the valve in the sleeve. A spring is installed on the valve in the sleeve. A retaining clip is installed to retain the sleeve, valve and spring in the valve body.

As noted above, in some methods the balancing port in the valve body can be plugged. It will, however, be appreciated that the single valve face on which pressure is exerted to move the valve against the spring force to open the valve, and conversely, a single valve face on which pressure is reduced to allow the valve to move, by the spring force, to close the valve assembly does not require that the balancing port is plugged. Rather, because the valve has a single face on which fluid pressure is exerted, the present lube boost valve serves as a limiting flow control valve and is less active than known boost valves, and as such will reduce wear of the valve body and valve.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as side(s), upper, lower, top, bottom, rearward, inboard, forward, outboard and the like may be for explanatory purposes only and may not be intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

The invention claimed is:

1. A drop-in lube boost valve assembly to replace an original equipment (OE) lube boost valve assembly in a vehicle transmission hydraulic circuit, the OE lube boost valve assembly having a valve body having an inlet port, a balancing port and an outlet port, the drop-in lube boost valve assembly comprising:
   a sleeve having an inlet port, an outlet port, and a bore extending between and fluidically connecting the inlet port and the outlet port, the inlet port and outlet port longitudinally spaced from each other, the sleeve including a valve chamber and a spring chamber, wherein an end of the spring chamber forms a valve exhaust;
   a valve having a sealing portion and a spring stem, the valve positioned in the sleeve with the sealing portion positioned in the sleeve bore, the valve having a valve face; and
   a spring, the spring positioned on the valve spring stem, wherein the valve reciprocates in the sleeve between an open state in which the sealing portion does not overlie the sleeve outlet port by application of a force exerted on the valve face by hydraulic fluid pressure and a closed state in which the sealing portion overlies and closes off the outlet port, and wherein the sealing portion is spaced from the sleeve inlet port in the open state and the closed state.

2. The drop-in valve assembly of claim 1, wherein the sleeve outlet port is aligned with the body outlet port.

3. The drop-in valve assembly of claim 1, wherein the sleeve inlet port is aligned with the body inlet port.

4. The drop-in valve assembly of claim 1, wherein the sleeve inlet port is positioned between body inlet port and the body balancing port.

5. The drop-in valve assembly of claim 4, wherein the sleeve includes a reduced diameter region at about an end thereof, and wherein fluid flowing into the body inlet port flows along the reduced diameter region to the sleeve inlet port.

6. The drop-in valve assembly of claim 1, further including a plug in the body balancing port.

7. The drop-in valve assembly of claim 1, wherein the sleeve is a one-piece element.

8. The drop-in valve assembly of claim 1, wherein the sleeve is a more than one-piece element.

9. The drop-in valve assembly of claim 1, further including a retaining member for retaining the sleeve, the valve and the spring in the valve body.

10. The drop-in valve assembly of claim 1, wherein the valve further includes a flange between the sealing portion and the spring stem.

11. A drop-in lube boost valve assembly to replace an original equipment (OE) lube boost valve assembly in a vehicle transmission hydraulic circuit, the OE lube boost valve assembly having a valve body having an inlet port, a balancing port and an outlet port, the drop-in lube boost valve comprising:

a valve having a sealing portion and a spring stem, the valve positioned in the sleeve with the sealing portion positioned in the sleeve bore, the valve having a single valve face; and a spring, the spring positioned on the valve spring stem, wherein the valve reciprocates in the sleeve between an open state in which the sealing portion does not overlie the sleeve outlet port by application of a force exerted on the single valve face by hydraulic fluid pressure and a closed state in which the sealing portion overlies and closes off the outlet port, and wherein the sealing portion is spaced from the sleeve inlet port in the open state and the closed state.

12. The drop-in valve assembly of claim 11, further including a retaining member for retaining the valve and the spring in the valve body.

13. The drop-in valve assembly of claim 11, wherein the valve further includes a flange between the sealing portion and the spring stem.

14. A kit for replacing an original equipment (OE) lube boost valve assembly in a vehicle transmission hydraulic circuit, the OE lube boost valve assembly having a valve body having an inlet port, a balancing port and an outlet port, the kit comprising:

a drop-in lube boost valve assembly having:

a sleeve having an inlet port, an outlet port, and a bore extending between and fluidically connecting the inlet port and the outlet port, the inlet port and outlet port longitudinally spaced from each other, the sleeve including a valve chamber and a spring chamber, wherein an end of the spring chamber forms a valve exhaust;

a valve having a sealing portion and a spring stem, the valve positioned in the sleeve with the sealing portion positioned in the sleeve bore, the valve having a valve face; and a spring, the spring positioned on the valve spring stem, wherein the valve reciprocates in the sleeve between an open state in which the sealing portion does not overlie the sleeve outlet port by application of a force exerted on the valve face by hydraulic fluid pressure and a closed state in which the sealing portion overlies and closes off the outlet port, and wherein the sealing portion is spaced from the sleeve inlet port in the open state and the closed state.

15. The kit of claim 14, further including a retaining clip.

16. The kit of claim 14, further including a plug for closing off the body balancing port.

17. A method for replacing an original equipment (OE) lube boost valve assembly in a vehicle transmission hydraulic circuit, the OE lube boost valve assembly having a valve body having an inlet port, a balancing port and an outlet port, the OE lube boost valve assembly having a valve in the OE lube boost valve body, the method comprising:

removing the OE lube boost valve from the OE lube boost valve body;

installing a sleeve in the OE lube boost valve body, the sleeve having an inlet port, an outlet port, and a bore extending between and fluidically connecting the inlet port and the outlet port, the inlet port and outlet port longitudinally spaced from each other, the sleeve including a valve chamber and a spring chamber, wherein an end of the spring chamber forms a valve exhaust;

installing a valve in the sleeve, the valve having a sealing portion and a spring stem, the valve positioned in the sleeve with the sealing portion positioned in the sleeve bore, the valve having a valve face; and installing a spring on the valve spring stem, and wherein the valve reciprocates in the sleeve between an open state in which the sealing portion does not overlie the sleeve outlet port by application of a force exerted on the valve face by hydraulic fluid pressure and a closed state in which the sealing portion overlies and closes off the outlet port, and wherein the sealing portion is spaced from the sleeve inlet port in the open state and the closed state.

18. The method of claim 17, further including installing a retaining clip on the valve body to retain the sleeve, the valve and the spring in the valve body.

* * * * *